J. F. LAWRENCE.
HYDROCARBON LAMP.
APPLICATION FILED APR. 24, 1911.
1,070,967.
Patented Aug. 19, 1913.
2 SHEETS—SHEET 1.
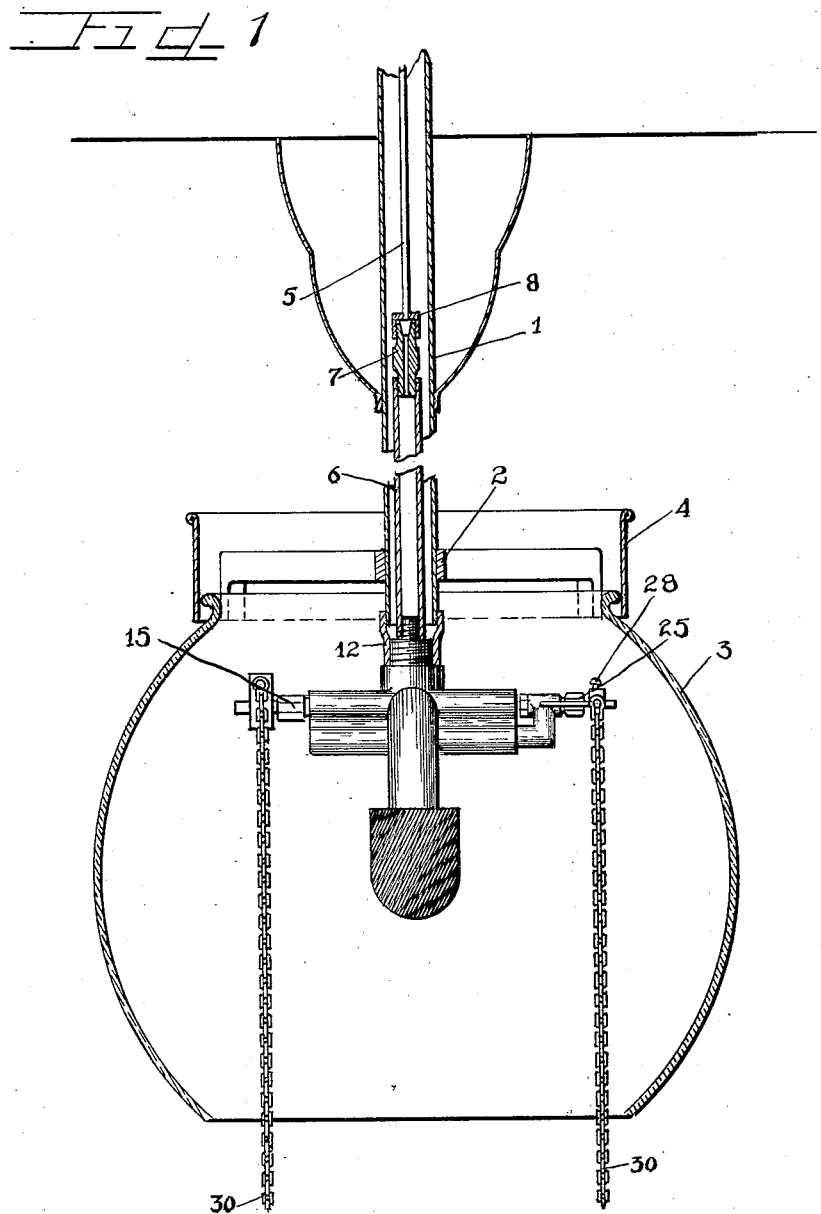

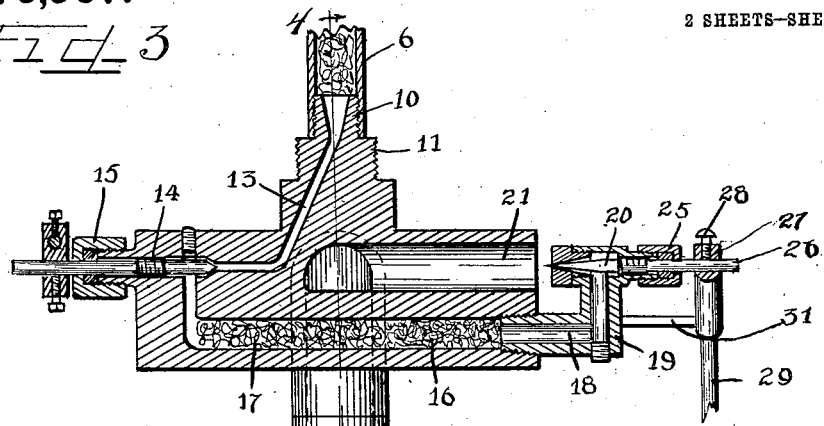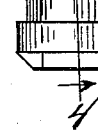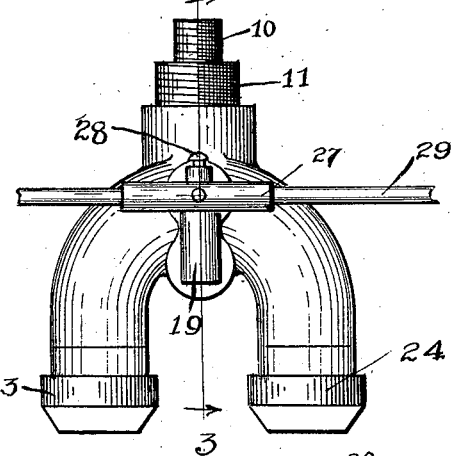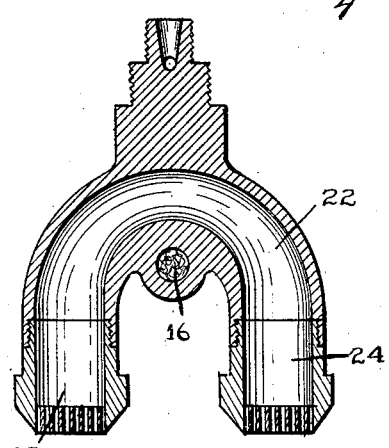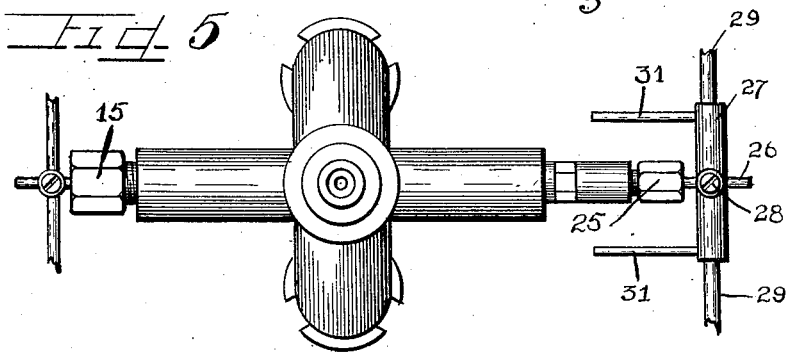

UNITED STATES PATENT OFFICE.

JAY F. LAWRENCE, OF CHICAGO, ILLINOIS.

HYDROCARBON-LAMP.

1,070,967.  Specification of Letters Patent.  Patented Aug. 19, 1913.

Application filed April 24, 1911. Serial No. 622,915.

*To all whom it may concern:*

Be it known that I, JAY F. LAWRENCE, a citizen of the United States, and a resident of the city of Chicago, in the county of Cook and State of Illinois, have invented certain new and useful Improvements in Hydrocarbon-Lamps; and I do hereby declare that the following is a full, clear, and exact description of the same, reference being had to the accompanying drawings, and to the numbers of reference marked thereon, which form a part of this specification.

Of the many hydro-carbon lamps heretofore placed on the market and particularly those in which the inverted burner with mantle is used, considerable difficulty has obtained in securing an adequate combustion to prevent the mantle blackening and thereby losing much of its radiating power. Of course, the difficulty arises mainly in the complete carbonization of the hydro-carbon used, for obviously with the proper carbonization of the volatile illuminant, combustion will be perfect and no tendency to blacken will be found. Another source of objection tending to retard and restrict the extensive introduction of such lamps arises from the fact that no adequate provision has heretofore been made to permit such lamps to be turned down readily so that a sufficient flame will at all times be left to maintain the carburation and to permit full illumination to be had by merely actuating the valve. In most of such constructions, should the combustion be much reduced, generation ceases and it again becomes necessary to start the lamp by the use of a torch or other heating means.

The object of this invention is to provide a construction wherein the light may be as conveniently turned down as in the case of lamps in which other hydro-carbons are used than gasoline. It is also an object of the invention to afford a construction in which generation continues as long as any flame whatever is maintained. It is further an object of the invention to so dispose the passages with reference to the burners as to insure the same receiving the maximum amount of heat from the combustion of the gases in the burners. It is also an object of the invention to afford a construction wherein the supply of the hydro-carbon may be entirely cut off by means of one valve, which also serves as means for the regulation of the flow and in which the illumination may be accurately adjusted by another valve, which also affords means for turning the lamp up or down.

The invention is shown also in connection with burners, though obviously capable of use with burners of other types.

On the drawings: Figure 1 is a central vertical section of a lamp embodying my invention, showing the generator in side elevation. Fig. 2 is an enlarged view of the burner taken at right angles of that shown in Fig. 1. Fig. 3 is a section taken on line 3—3 of Fig. 2. Fig. 4 is a section on line 4—4 of Fig. 3. Fig. 5 is a top plan view of the generator and burner.

As shown in the drawings: The lamp is shown suspended from the ceiling by means of a tube 1, on which is threaded the shade bracket 2, which also supports the globe 3, which, as shown, is open at the bottom and top. Surrounding the shade or globe and the bracket therefor conveniently, is a metallic band or casing 4, as is usual. Extending downwardly in the tubular rod or support 1, is a hollow wire 5, connected with the source of hydro-carbon supply, and as shown, said wire communicates with the feed pipe 6, by means of a nipple 7, which threads in said pipe and in the upper end of the nipple said hollow wire communicates therewith through the screw cap 8, connected on said nipple. Threaded on the lower end of the feed pipe 6, is the burner constructed of cast brass or other suitable material and which is provided at its upper end with a reduced threaded portion 10, which engages in said pipe and below which is a larger threaded portion 11, which is engaged on the pipe 1, by means of a reducing coupling 12, as shown in Fig. 1.

The generator is horizontally extended and is constructed conveniently of one piece of metal in which a passage 13, leads downwardly from the pipe 6, and toward one end thereof, and is adapted to be controlled by a valve 14, threaded into the end of the generator and adapted to close said passage. Said valve, as shown, extends through a suitable gland 15. Extending downwardly from the valve 14, to near the bottom of the block or bar forming the generator is a passage which communicates with a horizontal passage 16, filled with mineral wool or other absorbent material 17, and which is separated from the direct heat of the burner by a comparatively thin wall of the brass or other metal forming the generator as a whole. Threaded into the otherwise open end of the horizontal passage 16, at the opposite end thereof from the valve 14, is a tubular valve block 18, which communicates with said passage and in which a passage 19, leads upwardly to the horizontally directed needle valve 20, which is directed axially through a passage 21, of relatively large diameter and which opens into the relatively large passage 22, which communicates with the burners 23, and 24. Said burners, as shown, depend on each side the generator proper and are arranged in close relation beneath the same to conserve the heat thereof so much as possible when the illumination is reduced and said burners are connected by a common passage, as shown in Figs. 3 and 4 into which the passage 21, opens without obstruction.

A suitable gland 25, is provided to prevent leakage about the needle valve. A short bar 27, is provided with an aperture to receive the stem 26, of the needle valve therethrough and a set screw 28, is provided to engage said stem in any adjusted position. Rods 29, are rigidly connected into each end of the bar 27, and on the extremity of each is a chain 30, as is usual with such burners as are capable of operation continuously at a high or a low illumination.

Rods 31, are provided, which extend one on each side of the valve block 19, and engage the same to limit the adjustment of the needle valve by means of said chains to a point where sufficient generation is provided for the flame barrel sufficient only to maintain the generation. A similar transverse bar and chains are provided on the stem of the controlling valve 14, so that the flow may be augmented or limited by the adjustment of said valve.

The operation is as follows: Having properly connected the lamps with the source of hydro-carbon supply, the shut-off valve 14, is first adjusted to provide the requisite flow of the hydro-carbon and the first generation may be effected by means of a torch or any suitable means for affording the initial generation. Owing to the relatively thin wall below the generating passage 16, this is quickly accomplished, and opening the needle valve either by means of the chain or otherwise permits the hydrocarbon vapor to pass into the tube 21, carrying therewith sufficient air to maintain the combustion at the burners. As soon as generation commences, the gas is ignited in the mantles and the fervent heat thereof serves to continue the generation until the maximum lighting efficiency is attained. If, now, it should be desired to reduce the illumination, one of the chains 30, connected with the needle valve is pulled upon, tending to thread the valve inwardly toward its seat, thereby restricting the hydro-carbon supply and of necessity reducing the illumination. The illumination may be reduced to a point where almost invisible even at night, yet a sufficient generation be continued to supply the necessary mixture. A pull upon the other chain, however, serves to immediately increase the amount of the illuminant and increase the flame, whereupon generation immediately adjusts itself to the requirements of the burners. Should it be necessary at any time to wholly discontinue the illumination, this may be accomplished by pulling upon one of the chains connected with the shut-off valve. This quickly answers the purpose, inasmuch as no further illuminant can pass said valve.

Of course, it is an important part of my invention that the horizontally disposed generator receives a maximum amount of the heat of the burners and is passed in close relation with the burners and separated therefrom by a thin wall. The vaporized hydrocarbon passing upwardly through the needle valve is in the condition best to support illumination, inasmuch as the temperature thereof has been greatly raised.

I am aware that numerous details of the construction may be varied, and I therefore do not purpose limiting this application for patent otherwise than necessitated by the prior art.

I claim as my invention:

1. A hydro-carbon lamp embracing a horizontally disposed member, fuel passages extending down from the top and longitudinally along the bottom thereof, a mixing passage extending longitudinally from one end to the middle of said member, and integral burner arms passaged connectively with said mixing passage and extending down transversely below said horizontal member.

2. In a device of the class described a horizontally disposed member, integral burner arms curved downwardly on each side thereof transversely of the axis of said horizontal member, a mixing passage extending through said member for half its length, a continuous passage in said burner arms connected thereto, and feed and vaporizing passages extending down from the top of and extending longitudinally along the bottom of said horizontal member.

3. A device of the class described comprising a horizontal member, integral hollow burner arms extending downwardly therefrom and transversely thereof, a mixing passage extending from one end to the middle of said member, feed and vaporizing passages extending from a point above said mixing passage down, and below, and parallel to, to connect with the same, and feed and mixing valves in axial alinement at opposite ends of said horizontally disposed member.

4. In a hydro-carbon lamp, an integral vaporizing and mixing head comprising a horizontal member, an inclined passage extending downwardly from the top thereof toward one end, a horizontal passage extending for nearly the whole length of said head and near to the bottom thereof, a vertical passage connecting said two passages, a relatively larger mixing passage extending above said bottom passage for half the length of said head, integral burner arms depending downwardly from said head transversely of the middle thereof, and passages in said arms connecting with said mixing passage at the end of the same.

5. A device of the class described embracing a metallic casing, a feed passage, a generator passage, and a carbureting passage, all integrally connected therein, valves in said passages, and integral burner pipes extending down on either side of said casing and connected with said carbureting passage, affording a heating means for said casing.

In testimony whereof I have hereunto subscribed my name in the presence of two subscribing witnesses.

JAY F. LAWRENCE.

Witnesses:
CHARLES W. HILLS, Jr.,
LAWRENCE REIBSTEIN.

Copies of this patent may be obtained for five cents each, by addressing the "Commissioner of Patents, Washington, D. C."